Nov. 10, 1959    W. C. SCHREINER ET AL    2,912,301
METHOD OF REMOVING ACIDIC COMPONENTS FROM GASEOUS MIXTURES
Filed Oct. 18, 1956
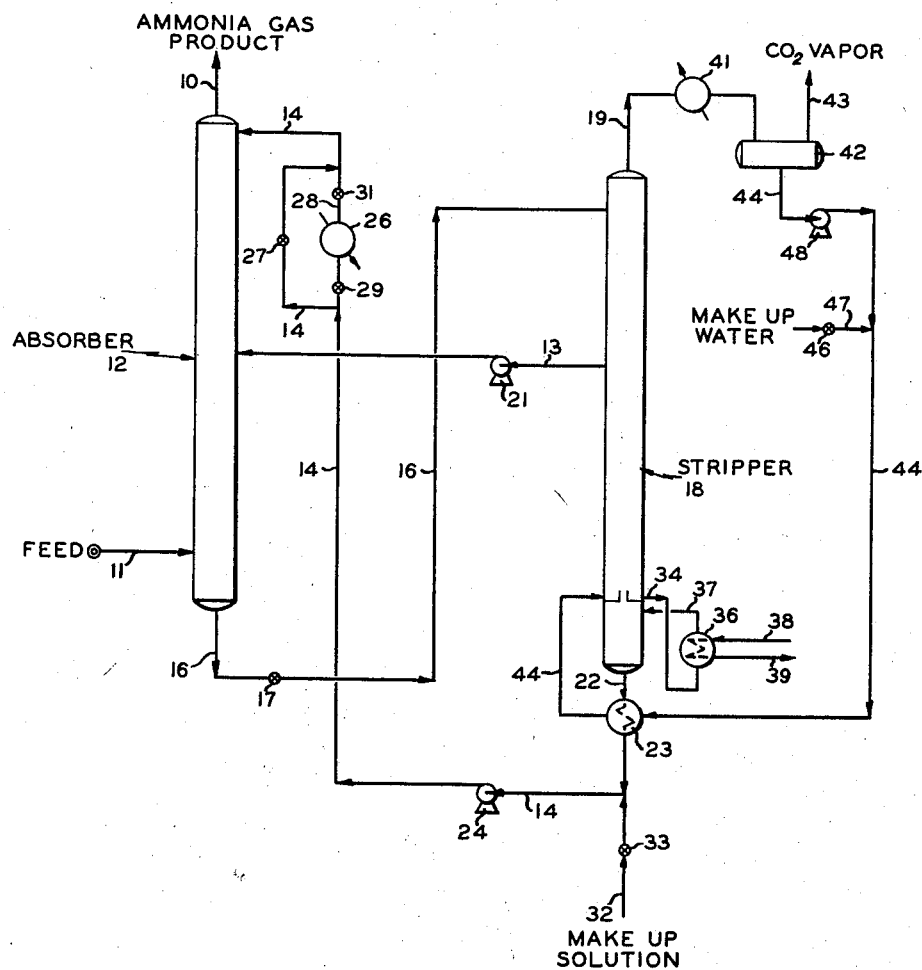
INVENTORS
WARREN C. SCHREINER
NICHOLAS WALEN, JR.
BY
*G. H. Palmer*    ATTORNEY
*J. J. Ward*    AGENT

United States Patent Office 2,912,301
Patented Nov. 10, 1959

2,912,301

METHOD OF REMOVING ACIDIC COMPONENTS FROM GASEOUS MIXTURES

Warren C. Schreiner, Franklin Square, and Nicholas Walen, Jr., Brooklyn, N.Y., assignors to The M. W. Kellogg Company, Jersey City, N.J., a corporation of Delaware Application October 18, 1956, Serial No. 616,872

9 Claims. (Cl. 23—3)

This invention relates to liquid-vapor absorption. One aspect of this invention relates to absorption of carbon dioxide in a liquid-vapor absorption process.

This application is a continuation in part of application S.N. 608,789, filed September 10, 1956. In many chemical and industrial processes, gaseous mixtures are obtained which contain undesirable acidic components such as carbon dioxide or hydrogen sulfide. Part or all of one or more of such acidic impurities can frequently be removed in one or more liquid-vapor absorption steps. In order to secure maximum effectiveness in such an absorption step, it is desirable to have the greatest possible amount of contact between liquid and vapor. Various means are used to secure maximum contact between liquid and vapor in a liquid-vapor absorption step. Frequently the absorption zone is filled or partially filled with solid packing material so designed and placed that it presents a large amount of surface area on which liquid films can form. Vapor flowing through the packing then contacts these liquid films and the desired absorption results. Another common method of securing maximum contact between liquid and vapor in a liquid-vapor absorption step is by equipping the absorption zone with bubble cap trays so designed that the maximum possible amount of contact between liquid and vapor is obtained.

We have found that under certain circumstances neither bubble trays nor packing can give entirely satisfactory results throughout the entire absorption step. This situation occurs principally in liquid-vapor absorption steps in which for various reasons the ratio of liquid to vapor changes radically during the process step. This may be brought about, for example, by the addition or withdrawal of large amounts of liquid or vapor at intermediate points in the absorption step. In such situations, we have found that it may be impractical to make use of either packing or bubble trays throughout the absorption step.

It is an object of this invention to provide an improved liquid-vapor absorption process.

It is another object of this invention to provide an improved liquid-vapor absorption process using a solution of an alkali metal carbonate as the absorption medium.

Another object of this invention is to provide an improved process for the purification of ammonia synthesis gas.

A further object of this invention is to provide an improved liquid-vapor absorption process for the removal of carbon dioxide and/or hydrogen sulfide from gaseous mixtures containing the same.

Other objects and advantages of this invention will become apparent to those skilled in the art from the accompanying description and disclosure.

One aspect of our invention relates to a liquid-vapor absorption process in which a gaseous mixture is contacted with an absorbent comprising a solution of an alkali metal carbonate for the absorption of an acidic gas from said mixture in which the ratio of liquid to vapor is greater than about 15 gallons of absorbent per mole of vapor during a first portion of a liquid-vapor absorption step and in which the liquid to vapor ratio is less than about 10 gallons of absorbent per mole of vapor during a second portion of said absorption step. In accordance with this aspect of our invention, the first portion of the absorption step, in which the ratio of liquid to vapor is greater than about 15 gallons of absorbent per mole of vapor, is carried out in an absorption zone containing suitable packing material while the portion of the absorption step in which the liquid to vapor ratio is less than about 10 gallons of absorbent per mole of vapor is carried out in an absorption zone containing bubble trays.

Packing used in practicing this invention may take the form of Raschig rings, saddles or other solids considered suitable by those skilled in the art for presenting a large amount of surface area in a liquid-vapor absorption zone. Packing may be of any suitable size and may consist of any suitable material but materials having surfaces which are relatively hard and smooth and resistant to abrasion or corrosion such as porcelain, steel, or rock are preferred. The term "packing" as used in this specification and the appended claims is intended to include any type of packing capable of being used as described above. Packing may be built into the absorption zone as an integral part thereof but is more usually removable.

The term "bubble trays" as used in this specification and the appended claims is intended to include bubble cap trays, perforated trays or any other type of tray, compartment or baffle serving a similar purpose, i.e., to promote maximum contact between vapor and liquid in the liquid-vapor absorption zone.

The use of a combination of packing and bubble trays in accordance with our invention is far superior under certain circumstances than the use of either bubble trays or packing alone because of the relatively high value of plate efficiencies of bubble trays at low liquid to vapor ratios and the relatively high value of mass transfer coefficients at high liquid to vapor ratios where packing is used. Under these circumstances, packing seems to be highly inefficient at low liquid to vapor ratios while bubble trays seem to be highly inefficient at high liquid to vapor ratios. This invention is not however limited to the above theory.

It has been found that, in accordance with this invention, the use of packing is strongly advisable in parts of an absorption step wherein the liquid to vapor ratio is greater than about 15 gallons of absorbent per mole of vapor while bubble trays are preferred in those portions of a liquid vapor absorption step wherein the liquid to vapor ratio is less than about 10 gallons of absorbent per mole of vapor. Other factors may effect the decision as to whether packing alone or bubble trays alone can be used but usually, if the liquid to vapor ratios in different parts of the absorption step are as indicated above, the use of a combination of bubble trays and packing is called for.

This invention is useful in connection with liquor-vapor absorption processes for the removal of weak acidic components such as carbon dioxide or hydrogen sulfide from gases containing these components. For many industrial uses it is desired to substantially remove such acidic components from gases containing the same. Many gases, such as natural gas or manufactured gases which are used in various industrial processes, contain varying quantities of these and other acidic components and these components should frequently be removed prior to using the gases in these processes. If not removed, these acidic components may cause corrosion and damage to reactors, valves and other equipment due to the formation of acids if any water is present. Ammonia synthesis gas for instance, comprises nitrogen and hydrogen and is frequently contaminated with comparatively large quantities of carbon dioxide which should be substantially removed prior to the use of the synthesis gas in the synthesis of ammonia. One method for removing such acidic components from gases involves the use of an alkaline liquid absorption medium to scrub the acidic component from the gases. The spent absorbent is then regenerated and recycled to the absorption zone.

According to a preferred embodiment of this invention, a gaseous mixture containing carbon dioxide is purified by the removal of carbon dioxide therefrom by scrubbing a partially purified portion of said mixture in a first absorption zone containing bubble trays and in which the ratio of liquid to vapor is less than about 10 gallons of absorbent per mole of vapor with a first lean portion of an absorbent comprising an aqueous solution of an alkali metal carbonate adapted to remove carbon dioxide from said gaseous mixture. The resulting partially spent absorbent is combined with a second lean portion of said absorbent and the resulting absorbent solution is used in a second absorption zone to scrub a portion of the carbon dioxide from a portion of the gaseous mixture. The second absorption zone contains packing and the liquid to vapor ratio in the second absorption zone is greater than about 15 gallons of absorbent per mole of vapor.

Absorbents suitable for removing acidic gases from gaseous mixtures containing the same in accordance with this invention include, for example, aqueous solutions of sodium or potassium carbonate. Such absorbents absorb the weak acid from the gaseous mixture being treated and are then capable of being regenerated by a reversal of the absorbent reaction as by boiling and/or steam stripping at a normal or reduced pressure. In practicing the present invention however, the preferred absorbing medium is an aqueous solution of potassium carbonate containing about 35 to about 45 weight per cent potassium carbonate.

In the removal of carbon dioxide by absorption with an aqueous solution of potassium carbonate, the spent absorption medium containing absorbed carbon dioxide may be regenerated by heating or by a sufficient pressure reduction or by a combination of these processes. In one aspect of the preferred embodiment of this invention, in which carbon dioxide is removed from ammonia synthesis gas contaminated therewith by the use of a potassium carbonate absorbent as described above, the spent absorbent is regenerated by stripping with steam at a pressure considerably below the pressure at which the absorption takes place. The steam used to strip the spent absorbent is advantageously the same fluid which is used as solution water. In order to use the solution water as stripping steam, it is necessary that the temperature of the stripping zone be maintained at or above the point at which such water will vaporize at the pressures used.

In one embodiment of this invention, the stripping zone is maintained at a temperature which is in the vicinity of the atmospheric boiling point of the absorption solution. Since steam stripping is desired, the temperature in the stripping zone must of course be sufficiently high so that at least a portion of the solution water will be in the vaporous form. The stripping zone is preferably maintained at atmospheric or slightly super-atmospheric pressures such as about 1 to about 10 p.s.i.g. and the absorption zone is preferably maintained at a sufficiently high pressure so that a satisfactory degree of absorption may be attained while maintaining the temperature in the absorption zone at approximately the same level as the temperature in the stripping zone. In this way it is unnecessary to maintain a large temperature difference between the stripping and absorption zones as would have to be done if the absoption and stripping zones were maintained at approximately equal pressures.

It has been found to be advantageous in the preferred embodiment of this invention to regenerate completely only a portion of the spent absorbent. The other portion of the spent absorbent, preferably a majority thereof, is preferably regenerated only partially. The partially regenerated absorbent is withdrawn from an intermediate point in the stripping zone and passed to an intermediate point in the absorption zone. The more completely regenerated portion is withdrawn from the lower portion of the stripping zone and passed to the upper portion of the absorption zone. The partially regenerated portion of absorbent may, for example, be withdrawn from a point about half way from the top to the bottom of a vertical stripping zone and passed to a point about half way from the top to the bottom of a vertical absorption zone. In this way, the partially regenerated absorbent is used to scrub the majority of the carbon dioxide from the gaseous mixture being treated while the more completely regenerated portion of the absorbent is used to scrub further amounts of carbon dioxide from the already partially purified gaseous mixture being treated. The absorption and stripping zones used in practicing this invention are preferably elongated vertical towers and are provided with bubble plates or packing or a combination thereof in accordance with this invention. If desired, the more completely regenerated portion of the absorbent withdrawn from the stripping zone may be cooled somewhat prior to being introduced to the upper portion of the absorption zone. Since the efficiency of the absorption of carbon dioxide with the preferred absorbent is higher at lower temperatures or higher pressures it can be seen that by cooling the relatively small portion of the more completely regenerated absorbent it is possible to reduce the carbon dioxide content of the gaseous mixture being treated to lower levels than would otherwise be possible while at the same time the disadvantages of cooling all the regenerated absorbent to the same temperature are eliminated. Cooling all of the regenerated absorbent would result in lower temperatures in the entire absorption zone and this in turn would lead to the necessity for either heating the spent absorbent or supplying additional heat to the stripping zone.

In one aspect of the preferred embodiment of this invention, the pressure in the absorption zone is preferably between about 200 and about 400 p.s.i.g. while the pressure in the stripping zone is preferably between about 0 and about 20 p.s.i.g. At the preferred pressures the absorption zone is preferably maintained at a top temperature between about 185 and about 220° F. and a bottom temperature between about 220 and about 290° F. while the stripping zone is preferably maintained at a top temperature between about 190 and about 260° F. and a bottom temperature between about 220 and about 290° F. The partially regenerated portion of absorbent which is passed from the intermediate portion of the stripping zone to the intermediate portion of the absorption zone is preferably at a temperature between about 220 and about 270° F. The partially regenerated portion of absorbent preferably contains less than about 6 standard cubic feet of carbon dioxide per gallon of absorbent solution while the more completely regenerated portion preferably contains less than about 3 standard cubic feet of carbon dioxide per gallon of absorbent solution. The more completely regenerated portion of absorbent from the lower portion of the stripping zone is preferably cooled to a temperature of about 180 to about 215° F. before being introduced into the upper portion of the absorption zone.

The overhead from the stripping zone which contains stripping steam and carbon dioxide is partially condensed so that carbon dioxide is released as a gas while stripping steam condenses to the liquid form. This condensed water has been customarily returned to the stripping tower as reflux. According to the present invention, however, it has been found to be advantageous to pass this condensed stripping steam in indirect heat exchange with absorption medium from the lower portion of the stripping zone and thereafter to introduce this condensate into the lower portion of the stripping zone. The overhead from the stripping zone is preferably cooled to a temperature of between about 100 to about 120° F. and is preferably reduced to about atmospheric pressure prior to separating the condensate for return to the stripping zone if preferred pressures are used. By contacting the condensed stripping steam in indirect heat exchange with absorbent withdrawn from the lower portion of the stripping zone the absorbent so contacted is cooled while at the same time the condensate is heated. The cooled absorbent is then passed to the absorption zone as described above while the condensate is passed to the stripping zone. Where this procedure is followed it is frequently unnecessary to further cool the absorbent removed from the lower portion of the stripping zone prior to its use in the upper portion of the absorption zone. At the same time at least a portion of the heat requirements of the stripping zone are supplied by the heated condensate. Introducing the condensate into the lower portion of the stripping zone rather than the upper portion allows it to be vaporized either prior to or immediately after its introduction into the stripping zone. It is thus available for use as stripping steam without having traveled in liquid form from the top to the bottom of the stripping zone. The additional liquid load imposed on the upper portions of the stripping zone by the introduction of such condensate as reflux to the upper portion of the stripping zone is thus eliminated. By introducing the condensate into the lower portion rather than the upper portion of the stripping zone, the advantages of using such condensate to maintain the proper concentration of absorbent in the stripping zone and to supply stripping steam are retained while the disadvantages of introducing such condensate to the upper portion of the stripping zone are avoided. Additionally, the method of heat exchanging the condensate with the portion of regenerated absorbent withdrawn from the lower portion of the stripping zone eliminates or substantially reduces the necessity for any cooling whatsoever of regenerated absorbent and at the same time reduces the heat requirements of the lower portion of the stripping zone. The temperature of the condensate following heat exchange with the absorbent is preferably between about 210 and about 280° F.

In the preferred embodiment of our invention described above, the major portion of the absorbent in the stripping zone is regenerated only partially while the remainder is more completely regenerated. The portion of the absorbent which is regenerated only partially is withdrawn from an intermediate point in the stripping zone and passed, preferably without cooling, to an intermediate point of the absorption zone. The portion of the absorbent which is more completely regenerated is withdrawn from the lower portion of the stripping zone, preferably cooled by indirect contact with condensed stripping steam, and then introduced into the upper portion of the absorption zone. Use of this process results in a situation wherein the upper section of the absorber and the lower section of the stripper have a considerably lower liquid to vapor ratio than do the lower and upper parts of the absorber and stripper respectively. This is brought about by the fact that the quantity of vapor passing upward through each tower is substantially the same in both the upper and lower sections while the amount of liquid passing down through each tower is greatly effected by the fact that a large proportion of regenerated absorbent is passed from an intermediate point of the stripping zone to an intermediate point of the absorption zone.

We have found that because of the substantial variation in the liquid to vapor ratios in each of the process steps, that is, absorption and stripping, it is decidely advantageous to utilize packing such as Raschig rings in the portion of the absorption and stripping zones where the higher liquid to vapor ratios exist and bubble trays such as bubble cap and perforated trays in the sections of the absorption and stripping zones where lower liquid to vapor ratios exist. In the preferred embodiment of our invention, the section of the absorption zone above the point where the partially regenerated absorbent is introduced and the section of the stripping zone below the point from which the partially regenerated absorbent is withdrawn are regions of comparatively low liquid to vapor ratios and are therefore preferably fitted with bubble trays. Likewise, the section of the absorption zone below the point at which the partially regenerated absorbent is introduced and the section of the stripping zone above the point from which the partially regenerated absorbent is withdrawn are regions of comparatively high liquid to vapor ratios and preferably contain packing such as Raschig rings, saddles, pellets of a suitable material such as alumina, etc. Packing is preferred in the regions of relatively high liquid to vapor ratios because of the relatively high value of the mass transfer coefficient at high liquid loadings whereas bubble plates are preferred in the regions of relatively low liquid to vapor ratios because of the relatively high value of plate efficiencies at low liquid loadings.

For a better understanding of this invention, reference should be had to the accompanying drawing which is a diagrammatic illustration of a preferred embodiment of this invention in which equipment is shown in elevation.

In the drawing, a gaseous feed mixture having the composition shown in Table I enters through a conduit 11 at the rate of 1,493.9 moles per hour.

TABLE I

*Feed composition*

| Component: | Mol percent |
|---|---|
| $H_2$ | 59.50 |
| $N_2$ | 19.78 |
| CO | 1.37 |
| $CO_2$ | 18.05 |
| $CH_4$ | 0.16 |
| A | 0.23 |
| $H_2O$ | 0.91 |
| | 100.0 |

The feed gas entering through conduit 11 is an ammonia synthesis gas prepared by conventional reforming of refinery gas or natural gas. The feed gas entering through conduit 11 passes into the lower portion of an absorber 12. In absorber 12, which is maintained at a pressure 215 p.s.i.g., the feed gas is scrubbed with a regenerated aqueous solution containing 40 weight percent potassium carbonate. Aqueous potassium carbonate is introduced into absorber 12 at two points. 17,880 gallons per hour of partially regenerated absorbent are introduced into absorber 12 via a pump 21 through a conduit 13 at a temperature of 225° F. 5940 gallons per hour of more completely regenerated potassium carbonate are introduced into absorber 12 through a conduit 14 at a temperature of 210° F. The potassium carbonate solution introduced through conduit 13 contains 5.5 standard cubic feet of $CO_2$ per gallon of carbonate solution while the carbonate solution introduced through conduit 14 contains 2.0 standard cubic feet of $CO_2$ per gallon of carbonate solution. The lower section of absorber 12 below the point where carbonate solution is introduced through conduit 13 is packed with Raschig rings whereas the upper section of absorber 12 above the point where partially regenerated absorbent is introduced through conduit 13 contains bubble trays.

Purified ammonia synthesis gas having the composition shown in Table II is withdrawn as overhead from absorber 12 through conduit 10 at a temperature of 215° F. at the rate of 1282 moles per hour as a product of the process.

TABLE II

*Composition of ammonia synthesis gas product*

| Component: | Mol percent |
|---|---|
| $H_2$ | 69.28 |
| $N_2$ | 23.05 |
| CO | 1.60 |
| $CO_2$ | .47 |
| $CH_4$ | .19 |
| A | .26 |
| $H_2O$ | 5.15 |

This gas is then treated with cuprous ammonium acetate for removal of CO prior to being used as feed to an ammonia synthesis reaction.

Spent absorbent containing 9.0 cubic feet of $CO_2$ per gallon is withdrawn from the bottom of absorber 12 through conduit 16 at a temperature of 232° F. at the rate of 24,800 gallons per hour. The spent absorbent in conduit 16 passes through a valve 17 and continues through conduit 16 to the upper portion of a stripper 18. Stripper 18 is maintained at a pressure of 6 p.s.i.g. In stripper 18 the spent absorbent is regenerated by contact with stripping steam. The combination of steam stripping and reduced pressure results in the release of the absorbed $CO_2$. Stripping steam and $CO_2$ are withdrawn as overhead from stripper 18 through conduit 19 at a temperature of 209° F. at the rate of 990 moles per hour. Partially regenerated absorbent is withdrawn from stripper 18 through conduit 13 and passed to an intermediate point of absorber 12 by pump 21 as previously described. More completely regenerated absorbent is withdrawn from the bottom of stripper 18 through conduit 22 at a temperature of 244° F. at the rate of 5940 gallons per hour, cooled to a temperature of 210° F. in a heat exchanger 23 and passed via a pump 24 through conduit 14 and valve 27 to absorber 12 as previously described. In the event that further cooling of the absorbent in conduit 14 is desired, a cooler 26 has been provided. Cooler 26 is not normally used but may if desired be used to further cool the absorbent in conduit 14 to a temperature as low as 195° F. In the event that cooler 26 is used, the absorbent in conduit 14 instead of passing through valve 27 will pass through conduit 28, valves 29 and 31 and cooler 26. In the event that any potassium carbonate is lost from the system, make-up solution may be added as desired through conduit 32 and valve 33 which is normally closed.

Stripper 18, like absorber 12, contains packing in the section where a relatively high liquid vapor ratio exists and contains bubble trays in the section in which a relatively low liquid to vapor ratio exists. In the case of stripper 18, the section of the tower above the point from which partially regenerated absorbent is withdrawn through conduit 13 is packed with Raschig rings while the section below this point contains bubble plates. In order to maintain the desired bottom temperature of 244° F. in stripper 18, a side stream is withdrawn from the lower portion of stripper 18 through conduit 34, heated in reboiler 36 and returned to stripper 18 through conduit 37. Heat for reboiler 36 is obtained from process fluid which enters through conduit 38 and leaves through conduit 39.

Overhead vapors withdraw from stripper 18 through conduit 19 are partially condensed in condenser 41 and continue through conduit 19 to a separation drum 42 which is maintained at a pressure of 0 p.s.i.g. and a temperature of 105° F. In drum 42, the liquid phase comprises condensed stripping steam while the vapor phase comprises $CO_2$. $CO_2$ from drum 42 is withdrawn through conduit 43 at the rate of 258.3 moles per hour while condensed stripping steam is withdrawn from drum 42 through conduit 44 at the rate of 25.2 gallons per minute. Make-up water is added through valve 46 and conduit 47 at the rate of 168 gallons per hour. The make-up water has a temperature of 150° F. The liquid in conduit 44 is passed by pump 48 through heat exchanger 23 where its temperature is raised from 109° F. to 227° F. by indirect heat exchange with regenerated absorbent in conduit 32. From heat exchanger 23 the liquid in conduit 44 continues to the lower portion of stripper 18 where it is vaporized by the higher temperature present therein.

Alterations and modifications of the above described embodiment of our invention may, of course, be made without departing from the scope thereof. Numerous changes in operating conditions, auxiliary equipment etc., may be made without departing from the scope of our invention. It will be recognized by those skilled in the art that our invention may be applied to many processes not mentioned herein which are also within the scope of our invention.

We claim:

1. In a liquid-vapor absorption process in which a gaseous mixture is contacted with an absorbent comprising a solution of an alkali metal carbonate for the absorption of acidic components from said mixture, in which the ratio of liquid to vapor is greater than about 15 gallons of absorbent per mole of vapor during a first portion of a liquid-vapor absorption step and in which the liquid to vapor ratio is less than about 10 gallons of absorbent per mole of vapor during a second portion of said absorption step and in which said first and second portions of the absorption step are conducted within a unitary vessel, the improvement which comprises carrying out said first portion of said absorption step in an absorption zone containing packing and carrying out said second portion of said absorption step in an absorption zone containing bubble trays.

2. The process according to claim 1 in which the acidic component is carbon dioxide and the alkali metal carbonate is potassium carbonate.

3. The process according to claim 2 in which the absorbent is an aqueous solution of potassium carbonate.

4. The process for the purification of a gaseous mixture containing carbon dioxide by the removal of carbon dioxide therefrom which comprises in a first absorption zone scrubbing a partially purified portion of said mixture with a first lean portion of an absorbent comprising an aqueous solution of an alkali metal carbonate adapted to remove carbon dioxide from said gaseous mixture, said first absorption zone containing bubble trays and having a liquid to vapor ratio of less than about 10 gallons of absorbent per mole of vapor; combining the resulting partially spent absorbent with a second lean portion of said absorbent and in a second absorption zone using the resulting absorbent solution to scrub a portion of the carbon dioxide from a portion of said gaseous mixture containing carbon dioxide, said second absorption zone containing packing and having a liquid to vapor ratio of greater than about 15 gallons of absorbent per mole of vapor and said first and second absorption zones being located within a unitary vessel; regenerating the resulting spent absorbent contaminated with carbon dioxide to produce said first and second lean portions of said absorbent by contacting said absorbent contaminated with carbon dioxide with stripping steam in a first stripping zone to remove carbon dioxide from said absorbent, said first stripping zone containing packing and having a liquid to vapor ratio of greater than about 15 gallons of absorbent per mole of vapor, thereby forming in said first stripping zone a liquid phase comprising an increasingly lean absorption solution of increasingly higher alkaline concentration in the direction of flow of the solution and the stripping zone and a vaporous phase comprising carbon dioxide and a portion of the solution water; withdrawing a portion of the partially regenerated absorbent from the lower portion of said first stripping zone as said second lean portion of said absorbent and using said second lean portion as described above; passing the remainder of said partially regenerated absorbent from said first stripping zone to a second stripping zone; in said second stripping zone contacting said partially regenerated absorbent with stripping steam to remove carbon dioxide from said partially regenerated absorbent thereby forming in said second stripping zone a liquid phase comprising an increasingly lean absorption solution of increasingly higher alkaline concentration in the direction of flow of the solution in the second stripping zone and a vaporous phase comprising carbon dioxide and a portion of the solution water, said second stripping zone containing bubble trays and having a liquid to vapor ratio of less than about 10 gallons of absorbent per mole of vapor and said first and second stripping zones being located within a unitary vessel; passing vapors from said second stripping zone to said first stripping zone; and withdrawing a portion of the regenerated absorbent from the lower portion of said second stripping zone as said first lean portion of said absorbent and using said first lean portion as described above.

5. The process for the purification of a gaseous mixture containing carbon dioxide by the removal of carbon dioxide therefrom which comprises in a first absorption zone scrubbing a partially purified portion of said mixture with a first lean portion of an absorbent comprising an aqueous solution of an alkali metal carbonate adapted to remove carbon dioxide from said gaseous mixture, said first absorption zone containing bubble trays and having a liquid to vapor ratio of less than about 10 gallons of absorbent per mole of vapor, combining the resulting partially spent absorbent with a second lean portion of said absorbent and in a second absorption zone using the resulting absorbent solution to scrub a portion of the carbon dioxide from a portion of said gaseous mixture containing carbon dioxide, said second absorption zone containing packing and having a liquid to vapor ratio of greater than about 15 gallons of absorbent per mole of vapor and said first and second absorption zones being located within a unitary vessel.

6. The process for removing carbon dioxide from an aqueous solution of an alkali metal carbonate absorbent containing the same which comprises contacting said absorbent with stripping steam in a first stripping zone under conditions adapted to remove carbon dioxide therefrom, said first stripping zone containing packing and having a liquid to vapor ratio of greater than about 15 gallons of absorbent per mole of vapor, thereby forming in said first stripping zone a liquid phase comprising an increasingly lean absorption solution of increasingly higher alkaline concentration in the direction of flow of the solution in the stripping zone and a vaporous phase comprising carbon dioxide and a portion of the solution water, withdrawing a portion of said solution from which carbon dioxide has been thus removed from the lower portion of said first stripping zone passing the remainder of said solution from said first stripping zone to a second stripping zone, in said second stripping zone contacting said solution with stripping steam to remove additional carbon dioxide from said solution thereby forming in said second stripping zone a liquid phase comprising an increasingly lean absorption solution of increasingly higher alkaline concentration in the direction of flow of the solution in the second stripping zone and a vaporous phase comprising carbon dioxide and a portion of the solution water, said second stripping zone containing bubble trays and having a liquid to vapor ratio of less than about 10 gallons of absorbent per mole of vapor, passing vapors from said second stripping zone to said first stripping zone, and withdrawing said alkaline absorption solution from the lower portion of said second stripping zone and said first and second stripping zones being located within a unitary vessel.

7. The process for the purification of a gaseous mixture containing carbon dioxide by the removal of carbon dioxide therefrom which comprises in a first absorption zone scrubbing a partially purified portion of said mixture with a first lean portion of an absorbent comprising an aqueous solution of an alkali metal carbonate adapted to remove carbon dioxide from said gaseous mixture, said first absorption zone containing bubble trays and having a liquid to vapor ratio of less than about 10 gallons of absorbent per mole of vapor, combining the resulting partially spent absorbent with a second lean portion of said absorbent and in a second absorption zone using the resulting absorbent solution to scrub a portion of the carbon dioxide from a portion of said gaseous mixture containing carbon dioxide, said second absorption zone containing packing and having a liquid to vapor ratio of greater than about 15 gallons of absorbent per mole of vapor and said first and second zones being located within a unitary vessel, regenerating the resulting spent absorbent contaminated with carbon dioxide to produce said first and second lean portions of said absorbent by contacting said absorbent contaminated with carbon dioxide with stripping steam in a first stripping zone to remove carbon dioxide from said absorbent, said first stripping zone containing packing and having a liquid to vapor ratio of greater than about 15 gallons of absorbent per mole of vapor, thereby forming in said first stripping zone a liquid phase comprising an increasingly lean absorption solution of increasingly higher alkaline concentration in the direction of flow of the solution in the stripping zone and a vaporous phase comprising carbon dioxide and a portion of the solution water, passing partially regenerated absorbent from said first stripping zone to a second stripping zone, in said second stripping zone contacting said partially regenerated absorbent with stripping steam under conditions adapted to remove carbon dioxide from said partially regenerated absorbent thereby forming in said second stripping zone a liquid phase comprising an increasingly lean absorption solution of increasingly higher alkaline concentration in the direction of flow of the solution in the second stripping zone and a vaporous phase comprising carbon dioxide and a portion of the solution water, said second stripping zone containing bubble trays and having a liquid to vapor ratio of less than about 10 gallons of absorbent per mole of vapor and said first and second stripping zones being located within a unitary vessel.

8. In a liquid-vapor absorption process in which a gaseous mixture containing acidic components of the group consisting of carbon dioxide and hydrogen sulfide, is contacted with an absorbent comprising a solution of an alkali metal carbonate for the absorption of acidic components from said mixture, in which the ratio of liquid to vapor is greater than about 15 gallons of absorbent per mole of vapor during a first portion of a liquid-vapor absorption step and in which the liquid to vapor ratio is less than about 10 gallons of absorbent per mole of vapor during a second portion of said absorption step and in which said first and second portions of the absorption step are conducted within a unitary vessel, the improvement which comprises carrying out said first portion of said absorption step in an absorption zone containing packing and carrying out said second portion of said absorption step in an absorption zone containing bubble trays.

9. The process according to claim 1 in which the acidic component is hydrogen sulfide and the alkali metal carbonate is potasisum carbonate.

References Cited in the file of this patent

UNITED STATES PATENTS 2,615,787    Randlett _____ Oct. 28, 1952

FOREIGN PATENTS 725,000    Great Britain _____ Mar. 2, 1955

OTHER REFERENCES

H. E. Benson et al.: "$CO_2$ Absorption Employing Hot Potassium Carbonate Solutions," Chemical Engineering Progress, vol. 50, No. 7, July 1954, pp. 356–364.